United States Patent
Bates et al.

(10) Patent No.: US 6,618,748 B1
(45) Date of Patent: Sep. 9, 2003

(54) METHOD, ARTICLE OF MANUFACTURE AND APPARATUS FOR RESTRICTING THE RECEIPT OF DELEGATE REPLY MESSAGES

(75) Inventors: Cary Lee Bates, Rochester, MN (US); Kurtis W. Ruby, Kasson, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/569,790

(22) Filed: May 12, 2000

(51) Int. Cl.[7] .............................................. G06F 15/16
(52) U.S. Cl. ...................................................... 709/206
(58) Field of Search ................................ 709/206, 219, 709/202, 203, 207

(56) References Cited

U.S. PATENT DOCUMENTS 5,627,764 A * 5/1997 Schutzman et al. ......... 709/207
6,016,478 A * 1/2000 Zhang et al. .................... 705/9
6,216,165 B1 * 4/2001 Woltz et al. ................. 709/232
6,356,937 B1 * 3/2002 Montville et al. ........... 709/206

\* cited by examiner

Primary Examiner—David Y. Eng
(74) Attorney, Agent, or Firm—Moser, Patterson & Sheridan, L.L.P.

(57) ABSTRACT

A method, article of manufacture, and apparatus for restricting the receipt of automatic delegate reply messages. Specifically, the method configures a control message for an electronic mail (e-mail) message addressed to at least one recipient terminal or computer, and sends the e-mail and control messages to the at least one recipient terminal. Upon processing the control message, the at least one recipient terminal determines whether to reply to the received e-mail message with a delegate reply message. As such, a sender of the e-mail message may restrict the receipt of delegate reply messages by configuring the control message through different features or options.

35 Claims, 5 Drawing Sheets

METHOD, ARTICLE OF MANUFACTURE AND APPARATUS FOR RESTRICTING THE RECEIPT OF DELEGATE REPLY MESSAGES

BACKGROUND OF THE INVENTION

1. Field of the Invention

The invention relates to electronic mail systems and, more particularly, the invention relates to a method, article of manufacture and apparatus for restricting the receipt of delegate reply messages.

2. Background of the Related Art

In today's electronic mail (e-mail) environment, many users utilize a delegate reply feature while away on vacation or business. This delegate reply feature may automatically create and send a delegate reply message in response to a sent message. The delegate reply message notifies the sender that the user, i.e., the recipient of the sent message, is unavailable or not present, and generally provides a reason for their absence.

Although the delegate reply message is useful to the recipients of the sent message, the delegate reply message also contributes to extraneous messages or clutter to the sender. When the message is sent to a large audience, this cluttering problem is exacerbated if the recipients in the audience use the automatic delegate reply feature. In this situation, extra effort is required by the sender to clean up the delegate reply messages. As such, the large amount of delegate reply e-mail received would discourage the sender from sending messages to such a large audience.

Therefore, a need exists in the art for a method, article of manufacture and apparatus prevent this cluttering problem by restricting the receipt of delegate reply messages.

SUMMARY OF THE INVENTION

The invention provides a method, article of manufacture and apparatus for restricting the receipt of delegate reply messages. In one embodiment, the invention provides a method for restricting the receipt of delegate reply messages comprising configuring a control message for an electronic mail (e-mail) message addressed to at least one recipient terminal or computer, and sending the e-mail and control messages to the at least one recipient terminal. Upon processing the control message, the at least one recipient terminal determines whether to reply to the received e-mail message with a delegate reply message.

In another embodiment, the invention provides a method for deleting delegate reply messages comprising receiving an automatic delegate reply message provided in response to a sent electronic mail message to at least one recipient terminal, and deleting the opened delegate reply message.

The invention also provides an apparatus comprising a memory and a processing unit, where the apparatus is configured for restricting the receipt of delegate reply messages. The memory stores an electronic mail message and a delegate reply restriction routine. The processing unit executes the delegate reply restriction routine retrieved from the memory, configures a control message for an electronic mail message upon command from an input device, and sends the electronic mail and control messages to at least one recipient terminal. Upon processing the control message, the at least one recipient terminal determines whether to reply to the received e-mail message with a delegate reply message. In this manner, the apparatus restricts the receipt of automatic delegate reply messages.

Additionally, a computer readable medium storing a software program is provided, where the software program, when executed by a computer, causes the computer to perform a method. In one embodiment of the computer readable medium, the method comprises configuring a control message for an electronic mail message addressed to at least one recipient terminal, and sending the electronic mail and control messages to the at least one recipient terminal. Upon processing the control message, the at least one recipient terminal determines whether to reply to the received e-mail message with a delegate reply message.

In another embodiment of the computer readable medium, the method comprises receiving an automatic delegate reply message provided in response to a sent electronic mail message to at least one recipient terminal, and deleting the opened delegate reply message.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENT

Figure 1:
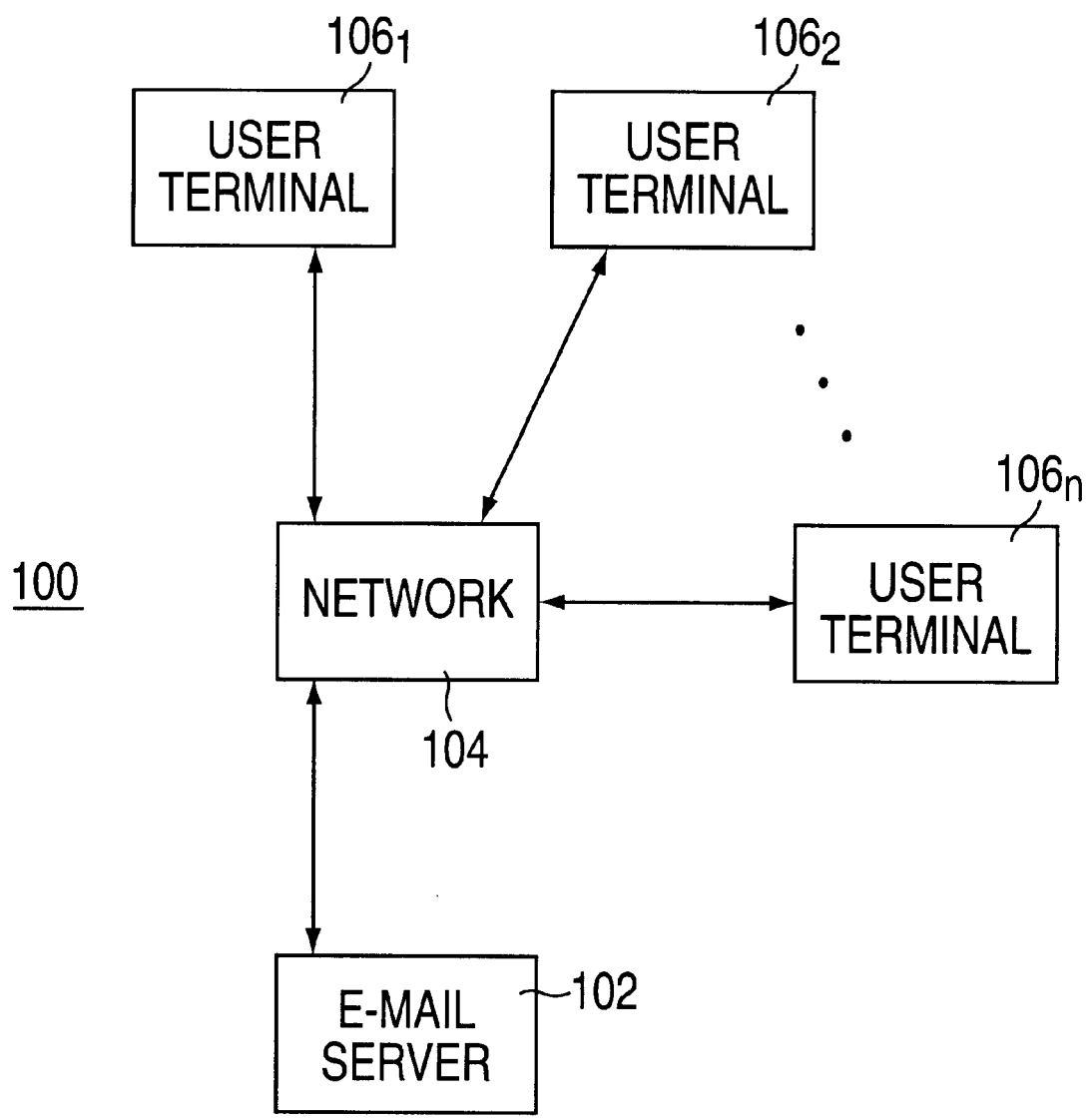
FIG. 1 depicts a simplified block diagram of an electronic mail system that benefits from the present invention.

FIG. 1 depicts an electronic mail (e-mail) system 100 that benefits from the use of the present invention. The present invention is embodied as an executable software routine(s) that generally resides within the user terminals 106. The system 100 comprises an e-mail server 102, a network 104 and a plurality of user terminals $106_1, 106_2, \ldots 106_n$. Each user terminal may be a computer system, an e-mail enabled network appliance, an e-mail enabled wireless device and the like. The user terminals 106 are connected to one another through the network 104 and also connected through the network 104 to the e-mail server 102. The e-mail server 102 provides e-mail services to all of the user terminals 106 such that e-mail addressed from one terminal to another is routed through the network 104 to the e-mail server 102. Each user terminal 106 may then retrieve its e-mail from the e-mail server 102. Although the system is shown having a hub and spoke configuration, other forms of networks may also benefit from the invention.

In addition to conventional e-mail messages, the system 100 routes control messages to the user terminals 106. These control messages may comprise a delegate flag for restricting whether other terminals may send a delegate reply message to a previously sent message. The control messages are handled and routed by the system 100 in exactly the same manner as conventional e-mail. The routines within each user terminal are designed to provide special processing for the control messages when received.

Figure 2:
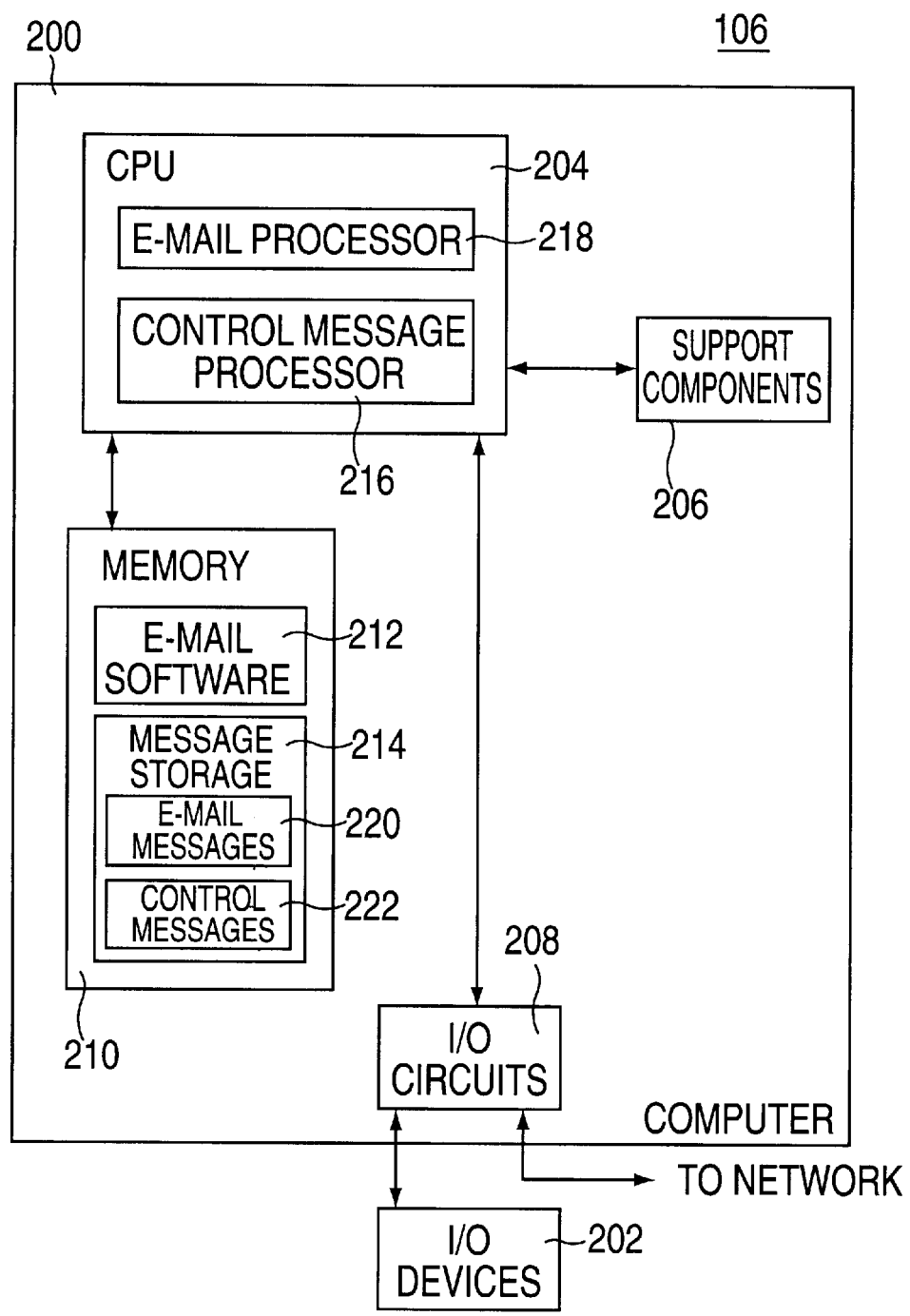
FIG. 2 depicts a simplified block diagram of a user terminal (computer) within the electronic mail system of FIG. 1.

FIG. 2 depicts a user terminal 106, e.g., a general purpose computer system. User terminal 106 comprises a computer 200 and an input/output device or devices 202 such as a monitor, a keyboard, a mouse, a trackball and the like. The computer 200 comprises a central processing unit 204, support components 206, input/output circuits 208 and a memory 210. The memory 210 may be a solid state memory, a disc drive, an optical memory, a removable memory device, or a combination of any of these memory devices. The input/output circuits 208 provide a well-known interface from the CPU 204 to the I/O devices 202. The support components 206 are well known in the art and include such circuits as cache, power supplies, clock circuits, and the like. The combination of all of these circuits, components and elements forms a general purpose computer that, when executing a particular software package or routine, becomes a specific purpose computer. In this case, the CPU 204, when executing the electronic mail processing software 212 of the present invention, operates as an e-mail processor 218 as well as a control message processor 216. The e-mail software 212 resides in memory 210. In addition, the electronic mail messages 220 including the control messages 222 are stored in a message storage 214 within the memory 210. In addition, the I/O circuits 208 generally contain a network interface card or modem that couples the computer to the network of FIG. I such that electronic mail messages can be routed to and from the computer 200.

As will be described in detail below, one embodiment of the invention is implemented as a program product for use with a computer system such as, for example, the system 100 shown in FIG. 1. The program(s) of the program product defines functions of the preferred embodiment and can be contained on a variety of signal/bearing media, which include, but are not limited to, (i) information permanently stored on non-writable storage media, (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. Such signal-bearing media, when carrying computer-readable instructions that direct the functions of the present invention, represent embodiments of the present invention.

In one embodiment of the invention, the control message processor 216 configures a control message associated with an e-mail message addressed to at least one recipient terminal or computer, e.g., one recipient terminal or a plurality of recipient terminals. The e-mail processor 218 and control message processor 216 then sends the respective e-mail and control messages to the at least one recipient terminal. The control message may comprise a delegate flag, where the at least one recipient terminal processes the control message for determining whether to reply to the received e-mail message with an automatic delegate reply message. The control message may be sent within the e-mail message or separate from the e-mail message.

The control message is configured to implement different features or options in a software routine, i.e., a delegate reply restriction routine. In one configuration of the control message, the invention disables all recipients of a sent message from responding with a delegate reply message. In another embodiment, the invention disables the recipients listed in a CC: field of the sent message from responding with a delegate reply message. In this case, the sender would only receive automatic delegate reply messages from recipients listed in the TO: field of the sent message. Additionally, the invention may disable all recipients of a sent message from responding with a delegate reply message only if the number of recipients addressed in the sent message is above a threshold number.

Figure 3A:
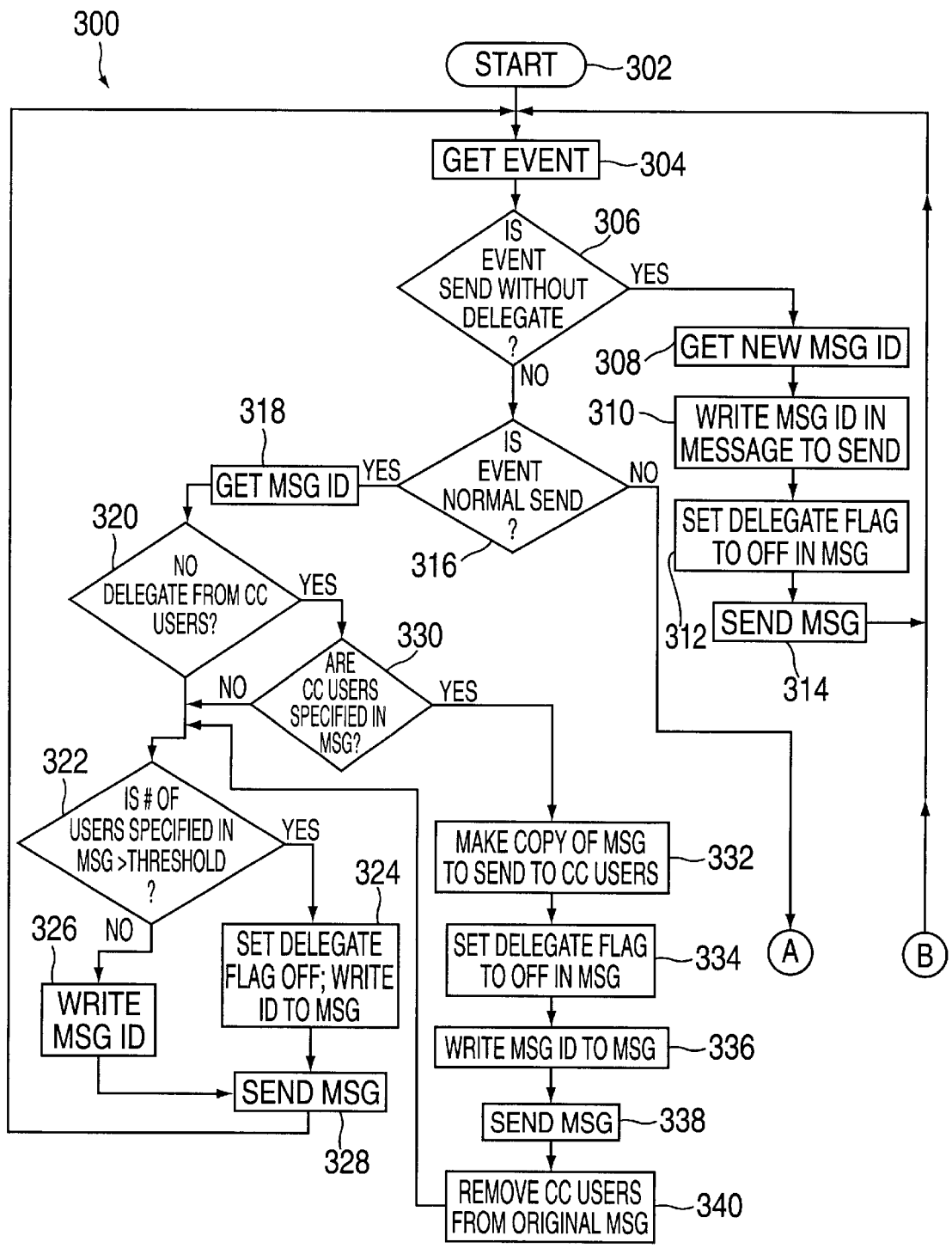
FIGS. 3A and 3B, taken together, depict a flow diagram for implementing a mail program having a delegate reply restriction feature of the present invention.
Figure 3B:
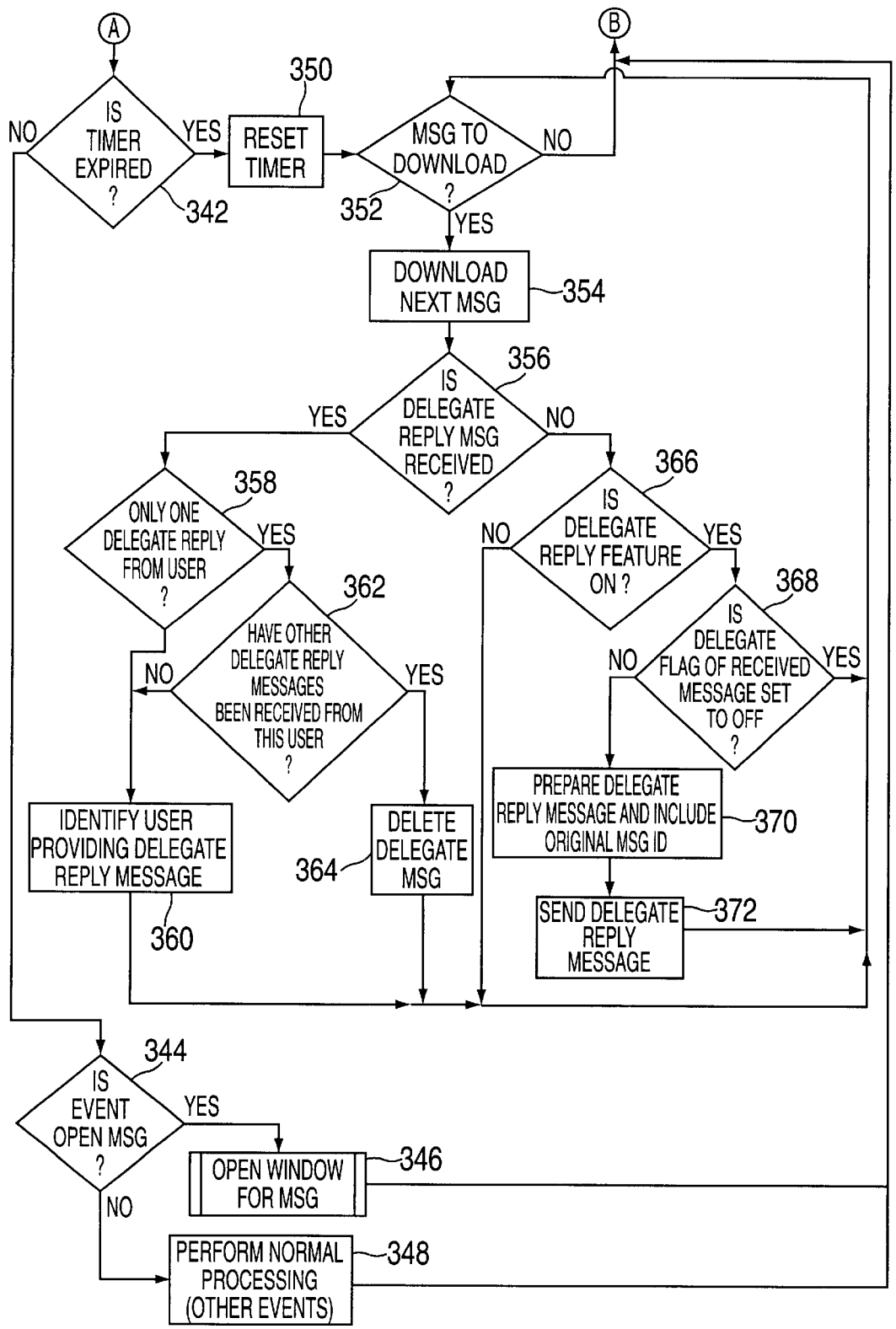
Figure 4:
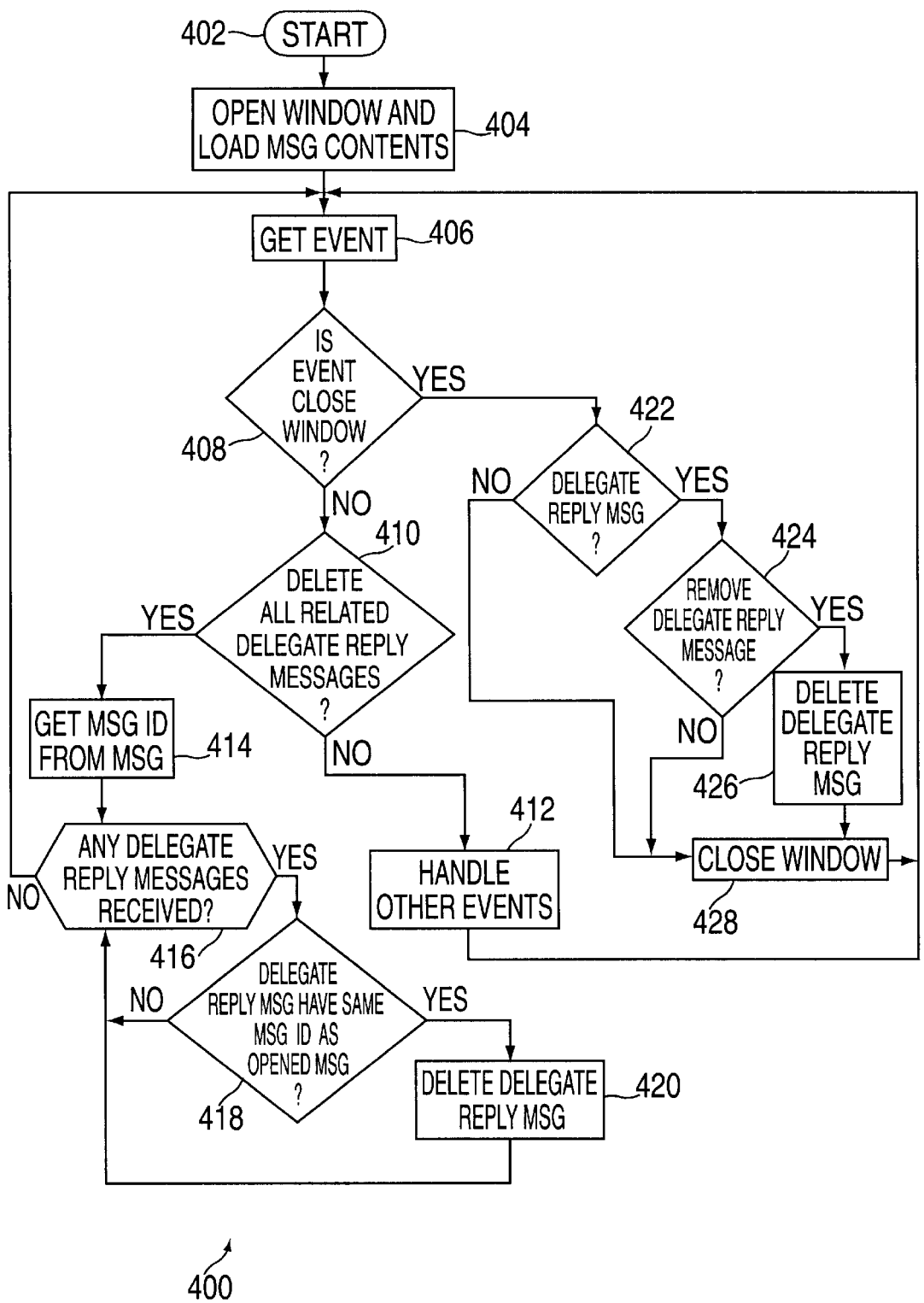
FIG. 4 depicts a flow diagram for handling a received message once the received message is opened.

FIG. 3A and FIG. 3B, taken together, depict a flow diagram of an e-mail program (method 300) for restricting the receipt of delegate reply messages. FIG. 4 depicts a flow diagram of a e-mail program (method 400) for implementing the cancellation or removal of delegate replies once a received message is opened. To best understand the invention, the reader should simultaneously refer to FIGS. 3A, 3B and 4.

The mail program is embodied in a method 300 shown in FIG. 3. The method 300 starts at step 302 and proceeds to retrieve an event at step 304. Such events may represent a particular command from a user, e.g., the sender of an e-mail message or the recipient of delegate reply messages. The sender may enter the command as an option or selection to a feature provided in the invention. The method 300 operates in an event-driven manner, i.e., the method 300 retrieves events and performs different steps depending on a particular event retrieved.

At step 306, the method 300 queries whether the event is to send an e-mail message without receiving any corresponding delegate reply messages. Namely, step 306 determines whether the sender desires to cancel or disable all delegate reply messages that may be provided in response to a sent e-mail message.

If the event is to send an e-mail message without receiving any delegate reply messages, the method 300 proceeds to create or obtain a message identifier for the message to be sent at step 308. In one embodiment of the invention, the message identifier includes sender and timestamp information. This timestamp information may comprise the date and time of the e-mail message to be sent. Other embodiments of the message identifier, e.g., a numerical value or terminal number, are also contemplated to be within the scope of the invention.

The method 300 proceeds to write the message identifier in the e-mail message to be sent at step 310. At step 312, the method 300 sets a delegate flag to an off state. This delegate flag may be part of a control message that is either transmitted with the e-mail message or embedded within the e-mail message. After setting the delegate flag, the method 300 proceeds to send the e-mail message at step 314 and retrieve the next event at step 304.

If the event is to send an e-mail message with the possibility of receiving delegate reply messages, i.e., the cancel delegate feature is not selected, the method 300 proceeds to step 316. At step 316, the method 300 queries whether the event is to send an e-mail message in a normal manner. Namely, step 316 determines whether the sender is to send an e-mail message. If the event is to send an e-mail message, the method proceeds to step 318, where a message identifier may be obtained in substantially the same manner as step 308.

At step 320, the method 300 queries whether the event is to receive delegate reply messages from recipients specified in the CC: field of a sent e-mail message. Namely, step 320 determines whether to limit the receipt of delegate reply messages from recipients specified in the TO: field, i.e., not receive delegate reply messages from recipients specified in the CC: field.

If the event is allows receipt of delegate reply messages from recipients in the CC: field in the e-mail message to be sent, the method 300 proceeds to step 322. At step 322, the method 300 determines whether the sender desires to send an e-mail message without receiving any delegate reply messages if the number of recipients addressed in the e-mail message to send exceeds a threshold number. The exact threshold number is selected by the sender, or predetermined by a programmer or a person having ordinary skill in the art.

If the number of recipients addressed in the e-mail message to be sent exceeds the threshold, the method 300 proceeds to step 324, where the method 300 sets the delegate flag to an off state and writes the message identifier in the message. The method 300 proceeds to send the e-mail message at step 328 and retrieve the next event at step 304. If the number of recipients addressed in the e-mail message to be sent does not exceed the threshold, the method 300 proceeds to write the message identifier in the e-mail message at step 326. The method 300 proceeds to send the e-mail message at step 328 and retrieve the next event at step 304.

Returning to step 320, if the event restricts the receipt of delegate reply messages from recipients in the CC: filed in the e-mail message to be sent, the method 300 determines whether the e-mail message specifies any recipients in CC: field. If no recipients are specified in the CC: field, the method 300 proceeds to step 322. If at least one recipient is specified in the CC: field, the method 300 proceeds to step 332, where the method 300 makes an additional copy of the e-mail message. This copy of the e-mail message is to be sent to the recipients originally listed in the CC: field.

At step 334, the method 300 sets the delegate flag to an off state. This delegate flag may be sent within a control message associated with the copy of the e-mail message to be sent to the recipients originally listed in the CC: field. The control message may be sent separate from or within the copy of the e-mail message. At step 336, the method writes the message identifier in the copy of the e-mail message to be sent. The method 300 proceeds to send the copy of the e-mail message to the recipients originally specified in the CC: field. The CC: listed users are removed from the original version of the message at step 340 before proceeding to step 322. In this manner, only the recipients originally listed in the CC: field are disabled from responding to the copy of the sent e-mail message with a delegate reply message.

Returning to step 316, if the event is not sending an e-mail message, i.e., the sender receives an e-mail message, then the method 300 proceeds to step 342. At step 342, the method 300 determines whether the timer has expired. This timer periodically expires such that the method 300 may download incoming mail at periodic intervals. If the timer is not expired, the method 300 proceeds to step 344, where the query is whether the event is to open a received e-mail message. This received e-mail message may comprise a normal e-mail message or a delegate reply message.

If the event is to open the received e-mail message, the method 300 proceeds to step 346, where a window is opened for the received e-mail message. Step 346 is embodied in method 400 as further described in connection with FIG. 4. After this step 346, the method 300 retrieves the next event at step 304. If the event is not to open the received e-mail message, the method 300 proceeds to perform normal processing at step 348 and retrieve the next event at step 304.

Returning to step 342, if the timer is expired, the method 300 proceeds to step 350, where the timer is reset. At step 352, the method 300 determines whether to download any e-mail messages that were received prior the expiration of the timer. Namely, step 352 queries whether any new e-mail messages to download. If there are no e-mail messages to download, the method 300 proceeds to retrieve a new event at step 304. If there are e-mail messages to download, the method 300 proceeds to download the received e-mail messages at step 354.

The method 300 proceeds to step 356 to determine whether the received e-mail message is a delegate reply message. If the received e-mail message is a delegate reply message, the method 300 proceeds to step 358, where a query is performed to determine whether to receive only one delegate reply message from a particular recipient of a previously sent e-mail message. Namely, step 358 determines whether to restrict the receipt of duplicate delegate reply messages from a recipient.

If the received messages are not restricted to one delegate reply message per recipient, the method 300 proceeds to step 360. At step 360, the method 300 identifies the recipient providing the received delegate reply message in response to a sent e-mail message. This identification is used to determine whether this recipient sends any subsequent delegate reply messages. The method 300 proceeds to determine whether any other e-mail messages were received before the timer expired at step 352.

If the received messages are restricted to one delegate reply per user, the method 300 proceeds to step 362, where the method 300 determines whether any delegate reply messages have been previously received from the same recipient responding with the delegate reply message. In one embodiment of the invention, step 362 determines whether the message identifier of the delegate reply message is the same as that of a prior delegate reply message from the same user. The message identifier may include sender and timestamp information as previously described in step 308. In turn, the delegate reply message has the same message identifier as the sent e-mail message that the delegate reply message was provided in response to. If the other delegate reply messages have been received from this recipient, the method 300 deletes the other delegate reply messages and proceeds to determine whether there are any additional email messages to download at step 352. If other delegate reply messages have not been received from this recipient, the method 300 proceeds to steps 360 and 352 as previously discussed.

Returning to step 356, if the received e-mail message is not a delegate reply message, the method proceeds to step 366. In this step 366, the method 300 queries whether the delegate reply feature is activated. If the delegate reply feature is activated, the method 300 proceeds to step 352. If the delegate reply feature is inactive, the method 300 proceeds to step 368, where the method 300 determines whether the delegate flag associated with the received message is inactive, e.g., in an off position.

If the delegate flag is inactive, e.g., in an off position, for the received e-mail message, the method 300 proceeds to step 352. If the delegate flag is active, e.g., in an on position, for the received e-mail message, the method 300 proceeds to prepare a delegate reply message and include the original message identifier therein at step 370. In one embodiment, the default position of delegate flag is the on position, i.e., the recipient terminal responds with a delegate reply message unless the delegate flag is in an inactive or off position. At step 372, the method 300 sends the delegate reply message in response to the received e-mail message, and proceeds to step 352.

Referring to FIG. 4, the method 400 is implemented when a received e-mail message is opened at step 346. The method 400 starts at step 402 and proceeds to step 404, where the window is opened and the message contents are loaded to the display. The method 400 proceeds to retrieve the next event at step 406. At step 408, the method 400 queries whether the event is to close the previously opened window.

If the window remains open, the method 400 proceeds to step 410, where a query is performed whether there is an event, i.e., a command using an option or feature, to delete all delegate reply messages related to the opened delegate reply message. Namely, step 410 determines whether to delete all delegate reply messages provided in response to the same e-mail message as the opened delegate reply message. To determine whether other delegate reply messages are related to the opened delegate reply message, the method 400 may compare message identifiers between the opened delegated reply message and other delegate reply messages, i.e., unread or previously opened delegate reply messages. With this feature, the user would open one of the delegate reply messages, and delete this and any other related delegate reply messages.

If the related delegate reply messages are not to be deleted, the method 400 proceeds to handle other events at step 412. After this step 412, the method 400 returns to step 406 for retrieving the next event. If the related delegate reply messages are to be deleted, the method 400 proceeds to step 414, where the message identifier is retrieved from the opened delegate reply message. This message identifier is used to determine other related delegate reply messages. At step 416, the method 400 queries whether any other delegate reply messages have been received. Step 416 determines whether any unopened, e.g., unread, or previously opened delegate reply messages have been received.

If there are no other delegate reply messages to process at step 416, the method proceeds to retrieve the next event at step 406. If there are other delegate reply messages to process at step 416, the method 400 proceeds to step 418, for determining whether the received delegate reply message and the opened message have the same message identifiers.

If a match exists between the message identifiers of the opened e-mail message and received delegate reply message at step 418, the method 400 proceeds to remove the matched delegate reply message at step 420. In this case, the method 400 proceeds to step 416 for determining whether other delegate reply messages have been received. If no match exists between the message identifiers of the opened and received delegate reply message at step 418, the method 400 proceeds to step 416, where the next received delegate reply message is considered. Steps 416 and 418 are repeated for each received, e.g., unopened, unread or previously opened, delegate reply message.

Returning to step 408, if the event is to close the previously opened window, the method 400 proceeds to step 422. In step 422, the method 400 determines whether the opened message is a delegate reply message. If the message is not a delegate reply message, the method 400 proceeds to close the window at step 428 and retrieve the next event at step 406.

If the message is a delegate reply message, the method 400 proceeds to step 424, where the method 400 queries whether to remove the e-mail message. Namely, the method 400 may implement a feature for automatically deleting the delegate reply message once the recipient is done viewing this e-mail message. If the remove delegate feature is selected, the method 400 deletes the delegate reply message at step 426, closes the window at step 428 and retrieves the next event at step 406. If the remove delegate feature is not selected, the method 400 proceeds to close the window at step 428 and retrieve the next event at step 406.

Although various embodiments which incorporate the teachings of the present invention have been shown and described in detail herein, those skilled in the art can readily devise many other varied embodiments that still incorporate these teachings.

What is claimed is:

1. A method of restricting the receipt of delegate reply messages comprising:

configuring a control message for an electronic mail message addressed to at least one recipient terminal; and sending the electronic mail and control messages to the at least one recipient terminal, where the at least one recipient terminal processes the received control message for determining whether to reply to the received electronic mail message with a delegate reply message.

2. The method of claim 1 wherein the at least one recipient terminal automatically replies with the delegate reply message upon processing the control message.

3. The method of claim 1 further comprising:

writing a message identifier into the electronic mail message before sending the electronic mail and control messages to the at least one recipient terminal.

4. The method of claim 3 wherein the message identifier of the electronic mail message is written into the delegate reply message provided in response to the electronic mail message.

5. The method of claim 3 wherein the message identifier comprises a sender identifier field and a timestamp field.

6. The method of claim 1 wherein the at least one recipient terminal fails to reply with the delegate reply message upon processing the control message.

7. The method of claim 1 wherein the at least one recipient terminal fails to reply with the delegate reply message upon processing the control message if the number of recipients addressed in the electronic mail message exceeds a threshold number.

8. The method of claim 1 wherein the at least one recipient terminal fails to reply with the delegate reply message upon processing the control message if a user identifier for the at least one recipient terminal is listed in a CC: field of the electronic mail message.

9. The method of claim 1 wherein the control message comprises a delegate flag.

10. The method of claim 9 wherein the at least one recipient terminal fails to reply with the delegate reply message upon processing the control message if the delegate flag is in an off position.

11. The method of claim 1 further comprising:

receiving a delegate reply message the at least one recipient terminal; and deleting other delegate reply messages if sent from the same recipient terminal as the previously opened delegate reply message.

12. The method of claim 1 further comprising:

opening a delegate reply message provided in response to a sent electronic mail message to the at least one recipient terminal; and deleting other delegate reply messages provided in response to the sent electronic mail message.

13. The method of claim 12 wherein the deleting occurs if the other delegate reply messages have substantially the same message identifier as the opened delegate reply message.

14. The method of claim 1 wherein the control message is embedded in a header of the electronic mail message.

15. The method of claim 1 wherein the control message and the electronic mail message are sent as separate messages.

16. An apparatus for restricting the receipt of delegate reply messages comprising:

a memory for storing an electronic mail message and a delegate reply restriction routine; and a processing unit, coupled to the memory, for executing the delegate reply restriction routine retrieved from the memory, configuring a control message for an electronic mail message upon command from an input device, and sending the electronic mail and control messages to at least one recipient terminal, where the at least one recipient terminal processes the received control message for determining whether to reply to the received electronic mail message with a delegate reply message.

17. The apparatus of claim 16 wherein said processing unit writes a message identifier into the electronic mail message before sending the electronic mail and control messages to the at least one recipient terminal.

18. The apparatus of claims 16 wherein the at least one recipient terminal fails to reply with the delegate reply message upon processing the control message.

19. The apparatus of claim 16 wherein the at least one recipient terminal fails to reply with the delegate reply message upon processing the control message if the number of recipients addressed in the electronic mail message exceeds a threshold number.

20. The apparatus of claim 16 wherein the at least one recipient terminal fails to reply with the delegate reply message upon processing the control message if a user identifier for the at least one recipient terminal is listed in a CC: field of the electronic mail message.

21. A computer readable medium storing a software program that, when executed by a computer, causes the computer to perform a method comprising:

configuring a control message for an electronic mail message addressed to at least one recipient terminal; and sending the electronic mail and control messages to the at least one recipient terminal, where the at least one recipient terminal processes the received control message for determining whether to reply to the received electronic mail message with a delegate reply message.

22. The computer readable medium of claim 21 wherein the at least one recipient terminal automatically replies with the delegate reply message upon processing the control message.

23. The computer readable medium of claim 21 further comprising:

writing a message identifier into the electronic mail message before sending the electronic mail and control messages to the at least one recipient terminal.

24. The computer readable medium of claim 23 wherein the message identifier of the electronic mail message is written into the delegate reply message provided in response to the electronic mail message.

25. The computer readable medium of claim 23 wherein the message identifier comprises a sender identifier field and a timestamp field.

26. The computer readable medium of claim 21 wherein the at least one recipient terminal fails to reply with the delegate reply message upon processing the control message.

27. The computer readable medium of claim 21 wherein the at least one recipient terminal fails to reply with the delegate reply message upon processing the control message if the number of recipients addressed in the electronic mail message exceeds a threshold number.

28. The computer readable medium of claim 21 wherein the at least one recipient terminal fails to reply with the delegate reply message upon processing the control message if a user identifier for the at least one recipient terminal is listed in a CC: field of the electronic mail message.

29. The computer readable medium of claim 21 wherein the control message comprises a delegate flag.

30. The computer readable medium of claim 29 wherein the at least one recipient terminal fails to reply with the delegate reply message upon processing the control message if the delegate flag is in an off position.

31. The computer readable medium of claim 21 further comprising:

receiving a delegate reply message the at least one recipient terminal; and deleting other delegate reply messages if sent from the same recipient terminal as the previously opened delegate reply message.

32. The computer readable medium of claim 21 further comprising:

opening a delegate reply message provided in response to a sent electronic mail message to the at least one recipient terminal; and deleting other delegate reply messages provided in response to the sent electronic mail message.

33. The computer readable medium of claim 32 wherein the deleting occurs if the other delegate reply messages have substantially the same message identifier as the opened delegate reply message.

34. The computer readable medium of claim 21 wherein the control message is embedded in a header of the electronic mail message.

35. The computer readable medium of claim 21 wherein the control message and the electronic mail message are sent as separate messages.

* * * * *